Nov. 4, 1941.         C. P. DANIEL         2,261,844
MINE CAR WHEEL AND AXLE ASSEMBLY
Filed Aug. 8, 1938          3 Sheets-Sheet 1
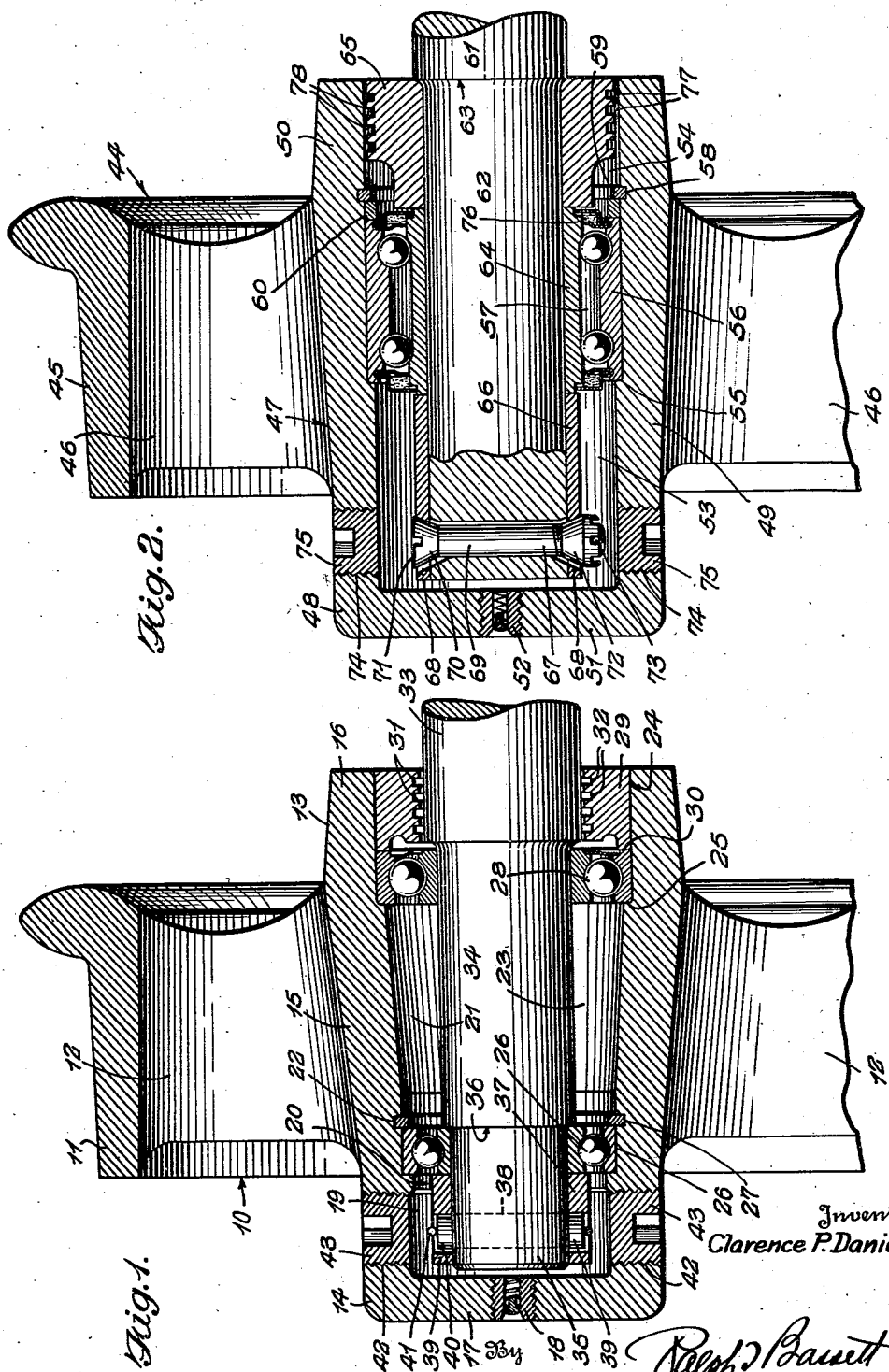
Inventor
Clarence P. Daniel
By Ralph D. Bassett
Attorney

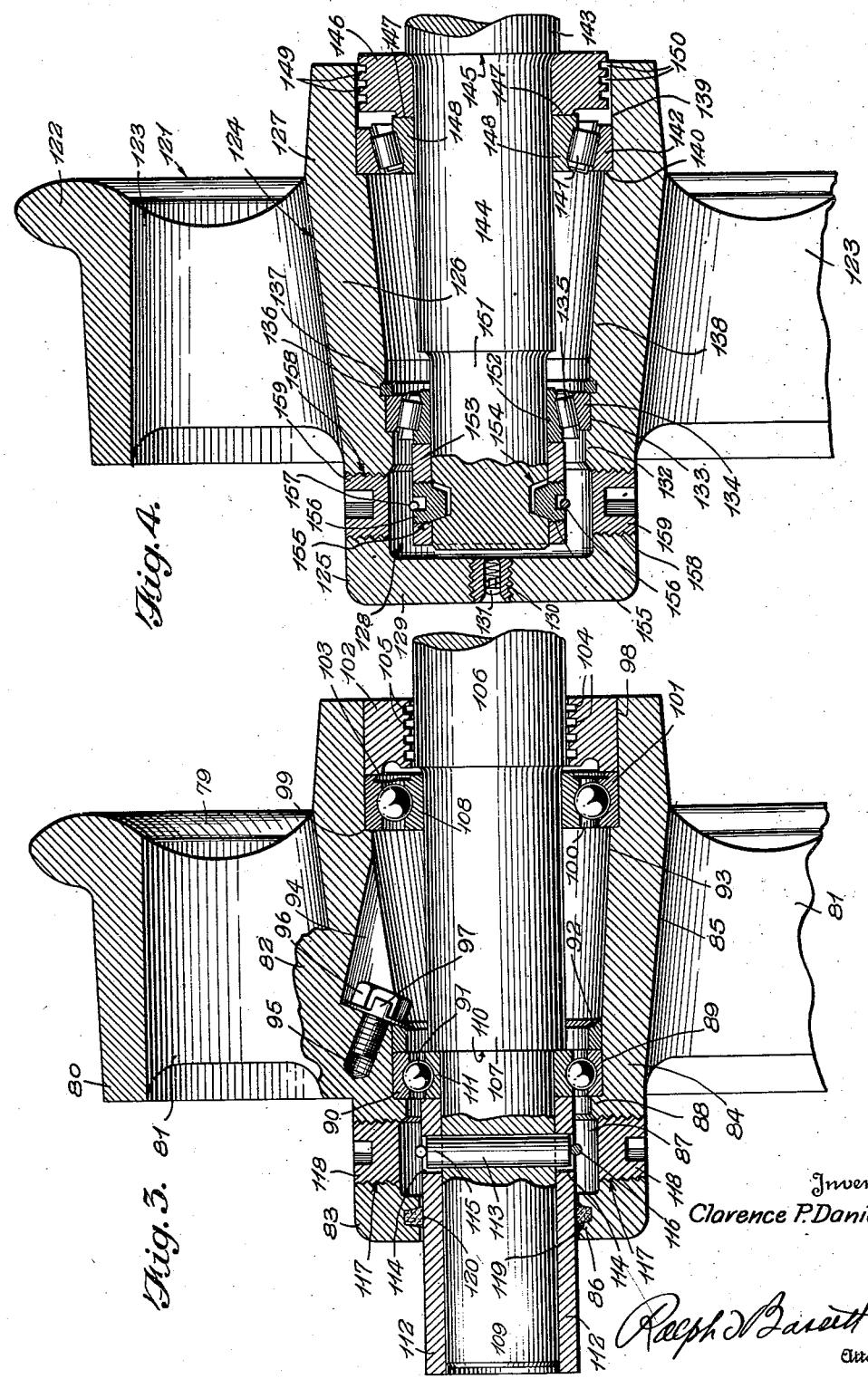

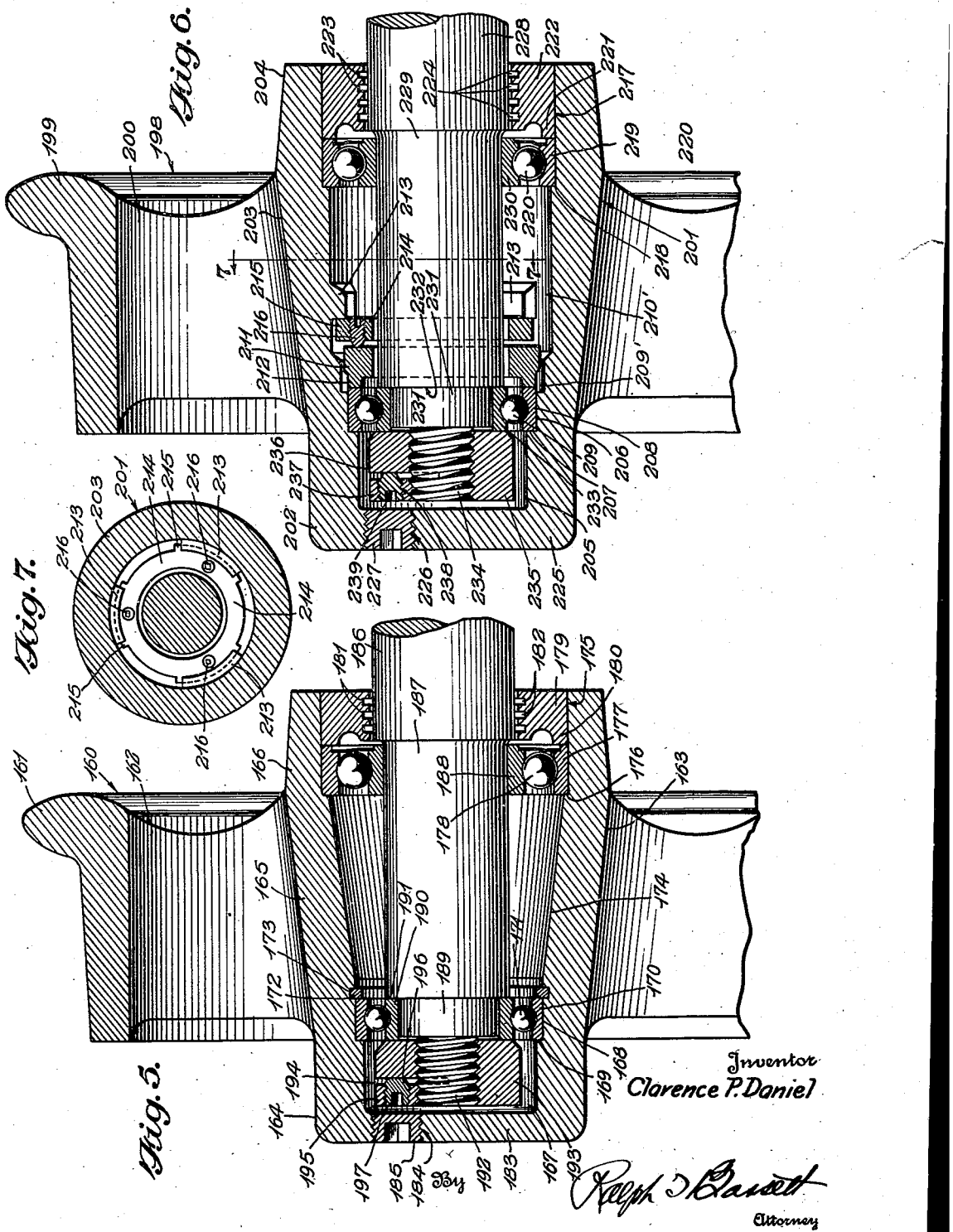

Patented Nov. 4, 1941

2,261,844

UNITED STATES PATENT OFFICE 2,261,844

MINE CAR WHEEL AND AXLE ASSEMBLY

Clarence P. Daniel, Bristol, Va.

Application August 8, 1938, Serial No. 223,771

14 Claims. (Cl. 308—180)

This invention relates to mine car wheels and has special reference to a hub and axle construction for mine car wheels.

Mine cars are usually of rugged construction with cast wheels revolubly mounted on the journal ends of the car axles. Due to the rough usage to which such cars are subjected breakages of the wheels occur more or less frequently and it then becomes necessary to replace the broken wheel by a new wheel.

One of the objects of the present invention is to produce a novel wheel hub and axle structure for mine cars whereby the wheel, while firmly held on the axle journal may be removed and a new wheel placed on the journal by unskilled labor and with but a simple tool equipment.

A second important object of the invention is to provide a device of the above mentioned character wherein antifriction bearings are employed, these bearings being carried by the wheel hub yet being so arranged and mounted that they may be readily removed from the hub when such removal becomes necessary or desirable.

With the above and other objects in view the invention consists in general of certain novel details of constructions and combinations of parts hereinafter fully described, illustrated in the accompanying drawings and pointed out in the claims.

In the accompanying drawings like characters of references indicate like parts in the several views, and—

Fig. 1 is a section taken diametrically through the hub and a portion of the rim of a mine car wheel and showing an axle journal and the antifriction assembly associated therewith, the view showing one form of the invention.

Fig. 2 is a similar view but showing a second form of the invention.

Fig. 3 is a similar view but showing a third form of the invention.

Fig. 4 is a similar view but showing a fourth form of the invention.

Fig. 5 is a similar view but showing a fifth form of the invention.

Fig. 6 is a similar view but showing a sixth form of the invention.

Fig. 7 is a detail section through the hub on the line 7—7 of Fig. 6.

In the embodiment of the invention as shown in Fig. 1 there is illustrated a portion of a car wheel indicated in general at 10 and having a rim 11, spokes 12 and hub 13. The hub 13 has an outer cylindrical portion 14 which merges at its inner end into the minor bore of a hub portion 15 having a frusto-conical exterior. This portion 15 thus has its major bore inwardly and merges into the major bore of a second and short portion 16 having a frusto-conical exterior surface. The outer end of the portion 14 is closed by a wall 17 and this wall is centrally drilled and tapped to receive a grease fitting 18. The hub is provided internally with an outer cylindrical bore 19 at the inner end of which an inwardly projecting rib 20 extends around the bore. A second cylindrical bore 21 extends toward the inner end of the hub from the rib and is provided with an annularly extending groove 22 forming a snap ring seat. The interior of the hub inwardly of the bore 21 is of frusto-conical form as at 23. At the inner end of the hub there is a cylindrical bore 24 at the outer end of which is a shoulder 25 defining the inner end of the frusto-conical portion, the bore 24 being of greater diameter than the major bore of the frusto-conical portion 23 to form this shoulder. An outer ball bearing 26 of the combined radial and thrust type has its outer race fitted with a tap fit in the bore 21 against the inner face of the rib 20 and an expansion snap ring 27 is fitted in the groove 22 so that this outer race is gripped between the rib 20 and snap ring 27. An inner ball bearing 28, also of the combined radial and thrust type, has its outer race fitted in the bore 24 with a tap fit and rests against the shoulder. A grease seal 29 is driven into the inner end of the bore 24 and has a peripheral rib 30 which bears against the outer race of the bearing 28 and thus holds it from movement away from the shoulder 25. This grease seal is provided internally with the alternate grooves 31 and ribs 32 to check passage of grease.

The axle has a main body portion 33 of proper diameter to fit closely within the grease seal 29 but without frictional contact therewith. Extending outwardly from the end of the axle body is an inner journal portion 34 fitting within the inner race of the bearing 28 with a sliding fit. Extending from the outer end of the journal portion 34 is an outer journal portion 35 so proportioned as to fit with a sliding fit in the inner race of the bearing 26. A shoulder 36 is provided at the junction of the two journal portions and this shoulder bears against the inner side face of the inner race of the bearing 26 to limit movement of the hub inwardly of the axle.

In order to retain the hub on the axle there is fitted on the outer end of the journal portion 35 a collar 37 which abuts the outer side face of the inner race of the bearing 26. A bore or pin hole 38 extends diametrically through the journal portion 35 adjacent its outer end and the collar is provided with diametrically disposed bore or pin holes 39 adapted to register with the pin hole 38. A pin 40 extends through the bore 38 and has its ends seated in the bores 38, being held therein by a contractile snap ring 41.

A pair of tapped holes 42 are arranged diametrically opposite each other in the hub portion 14 and are so located that they may be brought into axial alinement with the pin 40 by rotating the wheel on the axle. These holes 42 are normally closed by flush type plugs 43.

In setting up the assembly of this device the collar 37 is placed in the outer end of the hub with the snap ring 41 on it but out of alinement with the bore 38 and the bearing 26 inserted and secured by the snap ring 27. The bearing 28 is now inserted and the grease seal 29 driven in. The plugs 43 being removed the collar is manipulated through the holes 42 to axially aline it with the hub which is then slipped on the axle. The pin 40 is now inserted in the holes 38 and 39 through one of the holes 42 and, by a suitable tool, the snap ring 41 is moved to engage the pin ends as shown. The plugs are now inserted. To remove the wheel from its axle the plugs 43 are removed and the wheel turned to aline the holes 42 with the pin 40. The snap ring 41 is now pried off the pin ends and the latter may then be removed through the hole 42. The wheel may now be slipped freely off the axle.

In the form of the invention shown in Fig. 2 there is illustrated a portion of a car wheel indicated in general at 44 and having a rim 45, spokes 46 and hub 47. The hub 47 has an outer cylindrical portion 48 which merges at its inner end into the minor bore of a hub portion 49 having a frusto-conical exterior. This portion 49 thus has its major bore inwardly and merges into the major bore of a second and short portion 50 having a frusto-conical exterior surface. The outer end of the portion 48 is closed by a wall 51 and this wall is centrally drilled and tapped to receive a grease fitting 52. The interior of the hub is formed by an outer cylindrical bore 53 and an inner cylindrical bore 54 of somewhat larger diameter than the bore 53 so that a shoulder 55 is formed between the two bores. Within the bore 54 there is fitted with a tap fit the outer race 56 of a two row ball bearing 57 of the combined radial and thrust type, the race 56 bearing against the shoulder 55. In the bore 54 is formed an annular groove 58 for an expansion snap ring 59 and between the snap ring 59 and race 56 is fitted a spacer ring 60. At the end of the axle body 61 is a journal 62 of uniform diameter throughout its length, a shoulder 63 being formed between the journal and the axle body. The diameter of the journal is such as to fit within the inner race 64 of the ball bearing 57 with a sliding fit. Fitted tightly on the journal 62 and bearing against the shoulder 63 is a grease seal 65 which bears at its outer end against the inner face of the race 64. Fitted on the outer end of the journal 62 is an elongated collar or sleeve 66 which bears against the outer face of the race 64. A bore or bolt hole 67 extends diametrically through the journal 62 adjacent the outer end thereof and in the sleeve 66 is a pair of diametrically disposed bolt holes 68 slightly offset outwardly with respect to the hole 67. The holes 67 and the ends of the holes 66 are tapered to form countersinks. Through the hole 66 extends a bolt 69 having at one end a frusto-conical head 70 provided with a screw kerf 71. On the outer end of the bolt 69 is a frusto-conical castle nut 72 retained in the adjusted position by a keeper pin or cotter 73. It is to be observed that when the nut 72 is screwed up the bolt, being slightly smaller than the bore 67, acts to force the sleeve 66 against the race 64. Adjacent the outer end of the hub is a pair of tapped diametrically designed plug holes 74 wherein are screwed flush type plugs 75. The bearing 57 is provided with suitable seals 76 and the grease seal has alternate grooves 77 and ribs 78.

In assembling this form of the invention the collar or sleeve 66 is placed in the hub and the ball bearing 57 is then inserted and secured in place by the spacer ring 60 and snap ring 59. The grease seal 65 is mounted on the journal 62. The plugs 75 being removed the sleeve 66 is manipulated through the holes 74 to aline it axially of the hub and the hub is slipped on the journal. The bolt 69 is now dropped into place through a hole 74, the nut applied through the other hole 74 and screwed up until the sleeve is forced tightly against the race 64. The plugs 75 are now inserted.

To remove the wheel from the axle, the plugs 75 are removed and the wheel turned until the holes 74 aline with the bolt 69 whereupon the nut 72 may be removed and the bolt pushed out thus leaving the wheel free for removal. If a cotter or keeper pin 73 is used it may be inserted or removed by a pair of long-nosed pliers.

In the form of the invention shown in Fig. 3 there is illustrated a portion of a car wheel indicated in general at 79 and having a rim 80, spokes 81 and a hollow hub 82. The hub 82 has an outer cylindrical portion 83 which merges at its inner end into the minor bore of an intermediate portion 84 having a frusto-conical exterior. This portion 84 thus has its major bore inwardly and merges into an inner end portion 85 of frusto-conical exterior form with its minor bore inwardly. The outer end of the portion 83 is provided with an internal peripheral flange 86. The interior of the portion 83 forms a cylindrical bore or pocket 87 at the inner end of which is an annular rib 88. Extending toward the inner end of the hub from the rib 88 is a cylindrical bore 89 forming a seat for the outer race 90 of a ball bearing 91 of the combined radial and thrust type, this race bearing against the inner side face of the rib 88. A retaining or keeper ring 92 is seated in the bore 89 against the inner side face of the race 90. Extending toward the inner end of the hub from the bore 89 is a frusto-conical bore 93 having a series of diagonally disposed pockets formed therearound, one such pocket being shown at 94. Extending diagonally outward from the bottom of each pocket is a tapped hole 95 receiving the threaded shank of a cap screw 96. Beneath the head of this cap screw is fitted a lock-washer 97 which bears at one edge portion against the inner side face of the ring 92, this face being bevelled for the purpose of assuring a firm bearing for the washer. By this means the race 90, which is fitted in the bore 89 with a tap fit, is held firmly in place between the rib 88 and ring 92. Extending from the inner end of the bore 93 is a cylindrical bore 98 which is of slightly greater diameter than the inner end of the bore 93 so as to form an inwardly facing shoulder 99. A ball bearing 100 of the combined thrust and radial type has its outer race 101 fitted with a tap fit in the bore 98 and bears against the shoulder 99. In the inner end of the bore 98 there is fitted, with a driving fit, a grease seal ring 102 having on its outer face an annular flange or rib 103 which bears against the inner side face of the race 101 and thus holds it firmly against the shoulder 99. This grease seal has the usual alternate ribs 104 and grooves 105 extending around its inner periphery. The end 106 of the axle has a journal portion 107 extending outwardly therefrom and this portion is of such diameter as to have a sliding fit in the inner race 108 of the ball bearing 100, the end 106 fitting closely but without friction in the grease seal 102. Extending outwardly from the journal portion 107 is an outer or end journal portion 109 which is of less diameter than the portion 107 so that a shoulder 110 is formed between the two. The journal 109 fits in the inner race 111 of the ball bearing 91 and the shoulder 110 bears against the inner side face of this race. This journal portion 109 projects outwardly through the outer end of the hub and has fitted thereon a length of tubing forming a sleeve 112. Through the journal 109 extends a diametrically disposed pin hole 113 and in the sleeve 112 is formed a pair of diametrically disposed pin holes 114 so disposed that a pin 115 inserted in these holes will force the inner end of the sleeve 112 against the outer side face of the race 111 and thus hold the axle from longitudinal displacement in the hub. The pin is held in place by a contractile snap ring 116. Tapped holes 117 are diametrically disposed in the hub portion 83 and are so positioned that they may be brought into axial alinement with the pin 115 by rotating the wheel on the axle. These holes 117 are normally closed by flush type plugs 118 one of which may constitute a grease fitting. In the flange 86 is formed a groove 119 and a packing washer 120 of fabric or the like is fitted in this groove and bears on the sleeve 112 to form a grease and dust proof closure at the outer end of the hub.

In assembling this arrangement the packing 120 is put in place and the sleeve 112 partly inserted in the outer end of the hub with the snap ring 116 in place thereon but out of alinement with the holes 114. The ball bearing 91 is inserted and secured by the ring 92 and cap screws 96. Next the ball bearing 100 and grease seal 102 are put in place. The plugs 118 being removed, the hub may be readily slipped on the journal portions 107 and 109 and the wheel and sleeve 112 manipulated until the holes 113, 114 and 117 are alined. The pin 115 may now be inserted and the snap ring 116 moved along the sleeve until it engages the heads of the pin 115. The plugs 118 are now inserted and the device is completely assembled. To remove the wheel from the axle, the plugs 118 are removed and the wheel rotated until the holes 117 are alined with the pin 115, the snap ring 116 is then pried out of place and the pin 115 driven out through the hole 117.

In the invention as shown in Fig. 4 there is illustrated a wheel indicated in general at 121 and provided with a rim 122, spokes 123 and a hollow hub 124. The hub includes an outer end portion 125 having a cylindrical exterior, which merges at its inner end into the minor bore of the frusto-conical exterior of an intermediate hub portion 126. Extending from the inner end of the portion 126 the hub has an inner end portion 127 of frusto-conical exterior form, the major bore of this portion merging with the major bore of the portion 126. At the outer end of the hub there is provided a cylindrical pocket 128 which is closed at its outer end by an end wall 129 provided with a centrally disposed tapped hole 130 to receive an ordinary grease fitting 131. At the inner end of the pocket 128 is a rib 132 and extending towards the inner end of the hub from the rib 132 is a cylindrical bore 133 wherein is seated with a tap fit the outer race 134 of a roller bearing 135 of the combined radial and thrust type. In the bore 132 is formed an annular groove 136 wherein is held an expansion snap ring 137 which bears against the inner side face of the race 134 and holds this race firmly against the rib 132. Extending from the inner end of the bore 130 is a frusto-conical bore 138 having its major bore at its inner end. In the inner end of the hub is formed a cylindrical bore 139 which is of greater diameter than the inner end of the bore 138 so that a shoulder 140 is formed between the two, this shoulder facing the inner end of the hub. A roller bearing 141 of the combined radial and thrust type has its outer race 142 with a light driving or tap fit in the bore 139 and bears against the shoulder 140. The axle end 143 has extending therefrom a journal portion 144 of less diameter than the end 143 so that an outwardly facing shoulder 145 is formed between the two. A grease seal ring 146 is fitted on the journal portion 144 and bears against the shoulder 145 at its inner side face. This grease seal is provided on its outer side face with an annular rib 147 which bears against the inner side face of the inner race 148 of the roller bearing 141. This grease seal fits closely within, but without contact with the inner end of the hub and is provided with the usual alternate ribs 149 and grooves 150. Extending outwardly from the journal portion 144 is an outer or end journal portion 151 of less diameter than the portion 144 so that it may fit in the inner race 152 of the roller bearing 135 with a sliding fit. On the outer end portion of the journal portion 151 is fitted a length of tubing forming a sleeve or collar 153 and around the journal 151 beneath the sleeve extends a groove 154 of trapezoidal cross section. In the sleeve 153 is formed a pair of diametrically disposed and tapped holes 155 wherein are fitted cone pointed blind set screws 156 held against unscrewing by a contractile snap ring 157. It will be noted that the position of the set screws causes their points to bear against the outer side of the groove 154 and this forces the inner end of the sleeve 153 firmly against the outer side face of the race 152. The hub is thus held against movement longitudinally of the axle by co-action of the sleeve 153 and race 152 to prevent outward movement and co-action of the grease seal 146 and race 148 to prevent inward movement of the hub. In the outer portion 125 of the hub is tapped a pair of diametrically disposed plug holes 158 wherein are fitted flush type plugs 159, the holes 158 being alined opposite the groove 153.

This construction is assembled by placing the sleeve 153, with the snap ring 157 thereon but out of alinement with the holes 155, in the pocket 128. The roller bearing 135 is inserted and the snap ring 137 snapped into the groove 136. The roller bearing 141 is then forced into place against the shoulder 140. The grease ring is placed on the journal 144 against the shoulder 145 and the hub slipped on the axle, the sleeve 153 being manipulated through the holes 158 to bring it into axial alinement with the journal. The set screws 156 are now inserted through the holes 158 and the snap ring 157 moved to engage on these screws. Finally the plugs 159 are inserted.

To remove the wheel it is merely necessary to remove a plug 159 and pry the snap ring 157 to one side by use of a tool inserted through the open hole 158. The wheel is then turned on the axle to bring a set screw 156 opposite the open hole whereupon it may be unscrewed and removed. The other set screw is similarly removed whereupon the hub is free to slide off the axle.

In the form of the invention shown in Fig. 5 there is illustrated a portion of a car wheel indicated in general at 160 and having a rim 161, spokes 162 and hollow hub 163. The hub 163 has an outer end portion 164 of cylindrical exterior form and from this position extends an immediate portion 165 having a frusto-conical exterior which merges at its inner base into the portion 164. From the major bore of the part 165 extends the inner end 166 of the hub, this end being of frusto-conical exterior and having its major bore merging with the major bore of the part 165. In the outer end of the hub is formed a cylindrical pocket 167 and a cylindrical bore 168 extends inwardly of the pocket. The bore 168 is of greater diameter than the pocket 167 so that a shoulder 169 is formed between the two, this shoulder facing toward the inner end of the hub. In the bore 168 is seated the outer race 170 of a ball bearing 171 of the combined thrust and radial type, the race having a tap fit in the bore and bearing against the shoulder. Against the inner side face of the race is fitted an expansion snap ring 172 which seats in an annular groove 173 extending around the bore 168. Extending from the bore 168 towards the inner end of the hub is a bore 174 leaving its major bore inward and from this major bore extends an inner end bore 175 of greater diameter than the bore 174 so that a shoulder 176 is formed between the two, the shoulder facing inwardly of the hub. In the bore 175 is seated the outer race 177 of a ball bearing 178 of the radial type, the race being seated with a tap fit in the bore and resting against the shoulder 176. A grease seal ring 179 is seated in the end of the bore 175 with a press or drive fit and is provided with an annular rib 180 which bears against the inner side face of the race 177 and thus holds the latter against the shoulder 176. This grease seal ring is provided on its internal periphery with alternate ribs 181 and grooves 182. The outer end of the pocket 167 is closed by a wall 183 which is provided with a tapped hole 184 to receive a threaded flush type plug or grease fitting 185. Extending outwardly from the axle 186 is a journal portion 187 of such diameter as to fit within the inner race 188 of the ball bearing 178 with a sliding fit. An outer journal portion 189 extends from the outer end of the journal 187 and is of such diameter as to fit within the inner race 190 of the ball bearing 171 with a sliding fit. The journal 189 is of less diameter than the journal 187 so that an outwardly facing shoulder 191 is formed between the two. The shoulder 191 bears against the inner side face of the race 190 and the journal 189 is of slightly less length than the width of the race 190 so that the end face of the journal 189 is spaced slightly inward from the plane of the outer side face of the race 190. From the outer end of the journal 189 extends a reduced threaded lug 192 whereon is secured a nut 193 which bears against the outer side face of the race 190 so that the latter is gripped between this nut and the shoulder 191 and the hub is thus held from movement longitudinally in either direction on the axle. A slot 194 extends inwardly from one side of the nut 193 about to the middle of this nut so as to form a bendable tongue or lug 195 carrying a portion of the nut threads on its interior. In the lug 195 is a tapped hole 196 wherein is screwed a blind or flush type set screw 197 the point of which bears against the body of the nut so that, when the set screw is screwed up, the lug 195 is stressed to force the screw threads thereon into binding engagement with the threads of the end 192 and thus prevents rotation of the nut on said end. The plug 185 is arranged eccentrically of the hub so that, by rotation of the wheel, the plug and set screw 195 may be brought into alinement.

In assembling this invention the nut 193 is placed in the pocket, the set screw 197 being loosened or removed at this time. The ball bearing 171 is now seated in the bore 168 and the snap ring 172 snapped into its grooves 173. Next the ball bearing 178 is seated in the bore 175 against the shoulder 176 and the grease seal ring 179 forced into place. The hub is then slipped partly onto the axle so that the ball bearing 178 engages on the journal 187 and thus centers the hub on the journal. By means of a suitable tool inserted through the hole 184 the nut 193 is brought into axial alinement with the screw 192 and there held. By rotation of the wheel on the axle the nut 193 is also rotated and screws on the screw or lug 192. This movement is continued until the unit bears tightly against the race 190. The set screw 197 is inserted and screwed up tightly to lock the nut whereupon the plug or grease fitting 185 is screwed in and the assembly is completed.

To remove the wheel from the axle, the plug or grease fitting 185 is removed and the wheel rotated to bring the hole 184 into alinement with the set screw 197 which is unscrewed and removed through this hole. A rod or other tool is now inserted through the hole and into the hole 196 and the wheel rotated to unscrew the nut after which the hub will be readily slipped off of the journals.

In the invention as shown in Figs. 6 and 7 there is illustrated a portion of a car wheel indicated in general at 198 and this wheel has the usual rim 199, spokes 200 and hollow hub 201. The hub 201 has an outer end portion 202 of cylindrical exterior form and from this end an intermediate hub portion 203 having a frusto-conical exterior extends inwardly. The minor bore of this portion 203 is at its outer end and its exterior merges at this end into the exterior of the portion 202. The inner end 204 of the hub extends from the portion 203 and has a frusto-conical exterior which merges at its major bore into the major bore of the portion 203. In the portion 202 is a cylindrical pocket 205 and a cylindrical bore 206 extends from the pocket 205 toward the inner end of the hub and is of greater diameter than the pocket so that a shoulder 207 is formed between the two end faces toward the inner end of the hub. In the bore 206 is fitted the outer race 208 of a ball bearing 209 of the combined thrust and radial type, the race resting against the shoulder 207. Extending toward the inner end of the hub from the bore 206 is a pocket having an outer cylindrical portion 209' of minor diameter and a main or cylindrical portion 210 of major diameter. In the portion 209' is loosely fitted a retaining ring 211 having an annular rib 212 on its outer face which bears against the race 208 and holds the latter firmly against the shoulder 207. Extending from the wall of the pocket 210 is a set, preferably three, of spaced arcuate lugs 213. A ring 214 is provided with a similar set of peripheral and circumferentially spaced lugs 215 which engage against the outer side faces of the lugs 213, the spacing of the lugs 213 being such as to allow the lugs 215 to pass between them in assembling the device. This ring carries a series of set screws 216 of the blind or flush type and these set screws bear against the inner side face of the ring 211 and force it firmly into contact with the race 208. An inner end bore 217 extends from the inner end of the pocket 210 and is greater in diameter than this pocket so that a shoulder 218 is formed between the two and face toward the inner end of the hub. In the bore 217 is seated the outer race 219 of a ball bearing 220 which is here shown as of the combined thrust and radial type but which may be arranged as a radial bearing alone, the thrust function not being important in this case as will be presently understood. This race 219 rests against the shoulder 218 and is then held by an annular flange or rib 221 formed on a grease seal ring 222 which is forced into the inner end with a drive or press fit. The grease seal 222 is provided internally with circumferentially extending alternate ribs 223 and grooves 224. The outer end of the pocket 205 is closed by a wall 225 having a tapped hole 226 therein for the reception of a flush type plug or oiler fitting 227. The axle end 228 is of such diameter as to fit snugly but without friction within the grease seal ring 222 and from this end extends a journal portion 229 which is of such diameter as to fit with a sliding fit within the inner race 230 of the ball bearing 220. From the outer end of this journal portion extends a short journal portion 231 of less diameter than the portion 229 so that a shoulder 232 is formed between the two and faces outwardly to bear against the inner side face of the inner race 233 of the ball bearing 209. A reduced and threaded lug 234 whereon is screwed a nut 235 which bears against the outer side face of the race 233 and forces it firmly against the shoulder 232. The journal 231 is of less length than the width of the race 233 to permit this action. The race 233 is thus gripped firmly between the nut 235 and shoulder 232 and the hub is thereby prevented from longitudinal movement in either direction on the axle. The nut 235 has a slot 236 extending inwardly from one side to about the center of the nut so that there is formed a bendable lug 237 carrying a portion of the nut thread. In the lug 237 is tapped a hole 238 wherein is screwed a blind or flush type set screw 239 which bears at its joint against the body or main portion of the nut and, when screwed up, stresses the lug 237 and causes the thread portion thereon to bind against the thread on the lug 234 and thus prevents rotation of the nut. The hole 226 is so offset from the axis of the hub that rotation of the latter may bring this hole into alinement with the set screw 239.

In assembling this embodiment of the invention the nut 235 has the set screw 239 removed and is placed in the pocket 205. The ball bearing 209 is seated in the bore 206 against the shoulder 207 and the ring 211 is slipped into the pocket 209'. The ring 214 now arranged with its lugs 215 opposite the spaces between the lugs 213, is moved outwardly toward the ring 211 and is then turned to engage the lugs 215 against the outer side faces of the lugs 213 and the set screws 216 are screwed up to force the race 208 against the shoulder 207. The ball bearing 220 is seated in the bore 217 against the shoulder 218 and the grease seal 222 is forced into place. A suitable tool is inserted through the hole 226 and engaged in the hole 238. The tool is manipulated to bring the nut into axial alinement with the hub. The hub is now slid on the journals and the wheel is rotated which screws the nut on the lug or stud 234. When the lug is tight the set screw 239 is introduced and screwed up so as to bind the nut against rotation. Finally the plug or oiler fitting 227 is screwed in the hole 226 and the device is assembled.

To remove the wheel the plug or oiler fitting 227 is removed and the wheel turned to aline the whole 226 with the set screw 239 which is then removed through this hole. A rod or other tool is inserted through the hole 226 into the hole 238 and the wheel is rotated to unscrew the nut. When the nut is free the hub will easily slide off of the axle.

What is claimed is:

1. In a wheel and axle assembly for mine cars, a wheel having a hollow hub, an axle journaled in said hub in spaced concentric relation thereto, anti-friction bearing means interposed between said axle journal and hub and including outer and inner race means, said anti-friction bearing means being of the combined thrust and radial type, means located wholly within the hub and engaging opposite side faces of the outer race means and holding said bearing means fixed in said hub, fixed means on said axle engaging the inner side face of said inner race means, a sleeve slidably mounted for axial movement on the outer end of said axle and engaging the outer side face of said inner race means, removable means extending through said sleeve for engagement with said axle journal to urge the latter into firm engagement with the outer side face of said inner race means, said axle journal being provided with means for receiving the last mentioned means and coacting therewith to releasably hold the sleeve on the axle, said hub having an opening therein affording access to said removable means, and a removable plug normally closing said opening.

2. In a wheel and axle assembly for mine cars, a wheel having a hollow hub, an axle journaled in said hub in spaced concentric relation thereto, anti-friction bearing means interposed between said axle journal and hub and including outer and inner race means, said anti-friction bearing means being of the combined thrust and radial type, means located wholly within the hub and engaging opposite side faces of the outer race means and holding said bearing means fixed in said hub, fixed means on said axle engaging the inner side face of said inner race means, a sleeve slidably mounted on the outer end of said journal axle and bearing against the outer side face of said inner race means, said sleeve and axle having openings therein, a pin-like element passing into said openings, said openings in the sleeve being offset slightly in an outward direction from the opening in the axle journal whereby the pin-like element forces the sleeve against the race means, said hub having an access opening alinable with said openings for insertion and removal of said element, and a plug normally closing said opening.

3. In a wheel and axle assembly for mine cars, a wheel having a hollow hub, an axle journaled in said hub in spaced concentric relation thereto, anti-friction bearing means interposed between said axle journal and hub and including outer and inner race means, said anti-friction bearing means being of the combined thrust and radial type, means located wholly within the hub and engaging opposite side faces of the outer race means and holding said bearing means fixed in said hub, fixed means on said axle engaging the inner side face of said inner race means, a sleeve slidably mounted on the outer end of said journal axle and bearing against the outer side face of said inner race means, said sleeve and axle having pin holes therein, a pin-like element passing into said pin holes, said pin holes in the sleeve being offset slightly in an outward direction from the pin hole in the axle journal whereby the pin-like element forces the sleeve against the race means, said hub having an access opening alinable with said pin holes for insertion and removal of said element, a plug normally closing said opening, and retaining means for said element engaging the element removably and accessible for disengagement through said opening.

4. In a wheel and axle assembly for mine cars, a wheel having a hollow hub, an axle journaled in said hub in spaced concentric relation thereto, anti-friction bearing means interposed between said axle journal and hub and including outer and inner race means, said anti-friction bearing means being of the combined thrust and radial type, means located wholly within the hub and engaging opposite side faces of the outer race means and holding said bearing means fixed in said hub, fixed means on said axle engaging the inner side face of said inner race means, a sleeve slidably mounted on the outer end of said journal axle and bearing against the outer side face of said inner race means, said sleeve and axle having pin holes therein, a pin-like element passing into said pin holes, said pin holes in the sleeve being offset slightly in an outward direction from the pin hole in the axle journal whereby the pin-like element forces the sleeve against the race means, said hub having an access opening alinable with said pin holes for insertion and removal of said element, a plug normally closing said opening, and a contractible snap ring engaging over the ends of said element to retain it in place, said snap ring being accessible for displacement through said opening.

5. In a wheel and axle assembly for mine cars, a wheel having a hollow hub, an axle journaled in said hub in spaced concentric relation thereto, anti-friction bearing means interposed between said axle journal and hub and including outer and inner race means, said anti-friction bearing means being of the combined thrust and radial type, means located wholly within the hub and engaging opposite side faces of the outer race means and holding said bearing means fixed in said hub, fixed means on said axle engaging the inner side face of said inner race means, a sleeve slidably mounted on the outer end of said journal axle and bearing against the outer side face of said inner race means, said sleeve and axle having pin holes therein, a pin-like element passing through said pin holes, said pin holes in the sleeve being offset slightly in an outward direction from the pin hole in the axle journal whereby the pin-like element forces the sleeve against the race means, said hub having an access opening alinable with said pin holes for insertion and removal of said element, a plug normally closing said opening, said pin-like element having a head on one end and a threaded portion at the other end, and a nut screwed on said threaded end and accessible for removal through said opening.

6. In a wheel and axle assembly for mine cars, a wheel having a hollow hub, an axle journaled in said hub in spaced concentric relation thereto, anti-friction bearing means interposed between said axle journal and hub and including outer and inner race means, said anti-friction bearing means being of the combined thrust and radial type, means located wholly within the hub and engaging opposite side faces of the outer race means and holding said bearing means fixed in said hub, fixed means on said axle journal engaging the inner said face of said inner race means, a sleeve slidable on the outer end of said axle journal engaging the outer side face of said inner race means, said axle journal having a recess beneath said sleeve, said sleeve having holes alined with said recess, removable means in said holes and entering said recess, said hub having an opening affording access to said removable means, and a plug normally closing said opening.

7. In a wheel and axle assembly for mine cars, a wheel having a hollow hub, an axle journal in said hub in spaced concentric relation thereto, said hub having a shoulder therein facing toward the inner end of the hub, a ball bearing of combined radial and thrust type having its outer race seated in said hub and having an outer race bearing against said shoulder, said hub having an internal groove extending therearound, an expansible snap ring seated in said groove and urging said outer race against said shoulder, an axle journal having a shoulder facing towards its outer end, said bearing having an inner race seated on said axle journal against said shoulder, a sleeve slidably mounted on said journal and bearing against the outer side face of said inner race, said sleeve and axle journal having substantially alined openings therein, a headless pin seated in said openings, a contractible snap ring engaged on said sleeve over the ends of said pin, said hub having a pair of diametrically disposed openings affording access to said pin, and plugs normally closing said access openings.

8. In a wheel and axle assembly for mine cars, a wheel having a hollow hub, an axle journal in said hub in spaced concentric relation thereto, said hub having a shoulder therein facing toward the inner end of the hub, a ball bearing of combined radial and thrust type having its outer race seated in said hub and having an outer race bearing against said shoulder, said hub having an internal groove extending therearound, an expansible snap ring seated in said groove and urging said outer race against said shoulder, an axle journal having a shoulder facing towards its outer end, said bearing having an inner race seated on said axle journal against said shoulder, a sleeve slidably mounted on said journal and bearing against the outer side face of said inner race, said sleeve and axle journal having substantially alined openings therein, said openings being countersunk at their ends, a bolt having a frusto-conical head and held in said openings, a frusto-conical nut screwed on the bolt, said hub having a pair of diametrically disposed openings affording access to said bolt and nut, and plugs normally closing said access openings.

9. In a wheel and axle assembly for mine cars, a wheel having a hollow hub, an axle journal in said hub in spaced concentric relation thereto, said hub having a shoulder therein facing toward the inner end of the hub, a ball bearing of combined radial and thrust type having its outer race seated in said hub and having an outer race bearing against said shoulder, said hub having an internal groove extending therearound, an expansible snap ring seated in said groove and urging said outer race against said shoulder, an axle journal having a shoulder facing towards its outer end, said bearing having an inner race seated on said axle journal against said shoulder, an annular member arranged for axial movement on the end of said axle journal engaging the outer side face of said inner race, removable means cooperating with said annular member and releasably holding said annular member immovably on the axle journal, said hub having an opening therein affording access to said annular member for releasing the same.

10. In a wheel and axle assembly for mine cars, a wheel having a hollow hub, an axle journaled in said hub in spaced concentric relation thereto, anti-friction bearing means interposed between said axle journal and hub and including outer and inner race means, said anti-friction bearing means being of the combined thrust and radial type, means located wholly within the hub and engaging opposite side faces of the outer race means and holding said bearing means fixed in said hub, a threaded stud projecting axially from the end of said axle journal, a locking nut screwed on said stud and bearing against the outer side face of the inner race means, said locking nut carrying a set screw acting to lock the nut immovably on the stud, said hub having an end wall provided with an access opening affording access to the set screw, and a plug normally closing said access opening.

11. In a wheel and axle assembly for mine cars, a wheel having a hollow hub, an axle journaled in said hub in spaced concentric relation thereto, said hub having a shoulder therein facing toward the inner end of the hub, a ball bearing of combined radial and thrust type having its outer race seated in said hub and having an outer race bearing against said shoulder, said hub having an internal groove extending therearound, an expansible snap ring seated in said groove and urging said outer race against said shoulder, an axle journal having a shoulder facing towards its outer end, said bearing having an inner race seated on said axle journal against said shoulder, a threaded stud projecting axially from the end of said axle journal, a locking nut screwed on said stud and bearing against the outer side face of the inner race means, said locking nut carrying a set screw acting to lock the nut immovably on the stud, said hub having an end wall provided with an access opening affording access to the set screw, and a plug normally closing said access opening.

12. In a wheel and axle assembly for mine cars, a wheel having a hollow hub, an axle journaled in said hub in spaced concentric relation thereto, anti-friction bearing means interposed between said axle journal and hub and including outer and inner race means, said anti-friction bearing means being of the combined thrust and radial type, means located wholly within the hub and engaging opposite side faces of the outer race means and holding said bearing means fixed in said hub, fixed means on said axle engaging the inner side face of said inner race means, a sleeve mounted for axial movement on the outer end of said journal axle and bearing against the outer side face of said inner race means, said sleeve and axle having openings therein, a pin-like element passing into said openings, the openings in said sleeve and axle and said pin-like element being so constructed and arranged that said axially movable sleeve will be urged against the race means to secure same firmly against dislodgment from the fixed means on said axle, and said hub having an access opening for insertion and removal of said pin-like element.

13. In a wheel and axle assembly for mine cars, a wheel having a hollow hub, an axle journaled in said hub in spaced concentric relation thereto, anti-friction bearing means interposed between said axle journal and hub and including outer and inner race means, said anti-friction bearing means being of the combined thrust and radial type, means located wholly within the hub and engaging opposite side faces of the outer race means and holding said bearing means fixed in said hub, fixed means on said axle engaging the inner side face of said inner race means, a sleeve axially movable on the outer end of said journal axle and bearing against the outer side face of said inner race means, said sleeve and axle having registering openings formed therein, said hub having a radial opening alinable with said registering openings, means seating in said registering openings formed in said sleeve and axle for locking said sleeve on said axle and for urging said sleeve against said race means, whereby the parts are locked against displacement, and a plug for normally closing the opening in said hub.

14. In a wheel and axle assembly for mine cars, a wheel having a hollow hub, an axle journaled in said hub in spaced concentric relation thereto, anti-friction bearing means interposed between said axle journal and hub and including outer and inner race means, said anti-friction bearing means being of the combined thrust and radial type, means located wholly within the hub and engaging opposite side faces of the outer race means and holding said bearing means fixed in said hub, fixed means on said axle engaging the inner side face of said inner race means, a sleeve mounted for axial movement on the outer end of said journal axle and bearing against the outer side face of said inner race means, said sleeve being provided with a recess, said hub having an access opening alinable with said recess, means insertable through said access opening and into the recess in said sleeve for locking said sleeve on said axle journal and simultaneously causing said sleeve to be urged into closed contact against the outer side face of said inner race means, and a plug for normally closing the opening in said hub.

CLARENCE P. DANIEL.